C. DAMINAITIS.
TIME CONTROLLED STOCK FEEDER.
APPLICATION FILED JAN. 8, 1913.

1,076,193.

Patented Oct. 21, 1913.

Witnesses
A. L. Richey
Gertrude M. Werner

Inventor
Charles Daminaitis
By John A. Bomnhardt
Attorney

UNITED STATES PATENT OFFICE.

CHARLES DAMINAITIS, OF CLEVELAND, OHIO.

TIME-CONTROLLED STOCK-FEEDER.

1,076,193.  Specification of Letters Patent.  Patented Oct. 21, 1913.

Application filed January 8, 1913. Serial No. 740,822.

*To all whom it may concern:*

Be it known that I, CHARLES DAMINAITIS, citizen of the United States, residing at Cleveland, in the county of Cuyahoga and State of Ohio, have invented certain new and useful Improvements in Time-Controlled Stock-Feeders, of which the following is a specification.

This invention is a time controlled stock feeder, particularly adapted and intended for feeding poultry.

The object of the invention is to form an improved device of the kind, which is capable of being hung or stood in any desired location, the feed hopper being controlled by a clock operated device, and below the hopper is a spreader which serves to distribute the grain, and also serves as a base or stand to support the hopper when desired to be placed on the floor or ground. The hopper is also provided with a bail whereby it be hung up if desired.

The invention is illustrated in the accompanying drawings in which—

Figure 1:
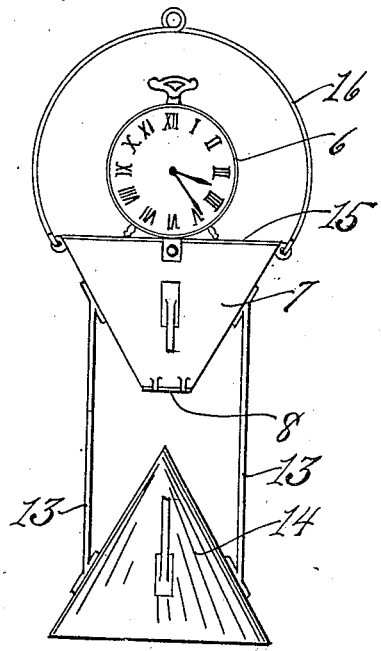
Figure 3:
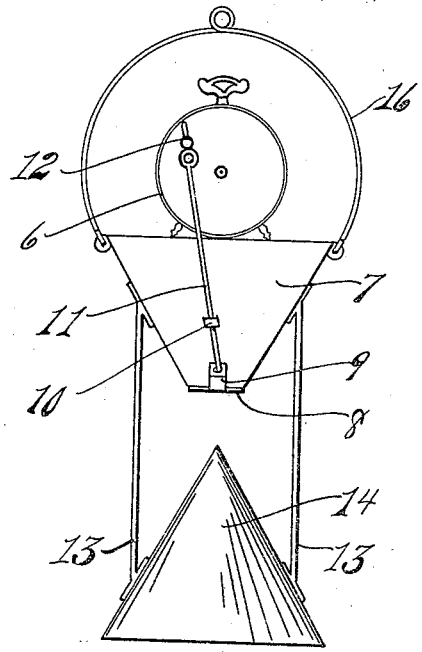
Figure 2:
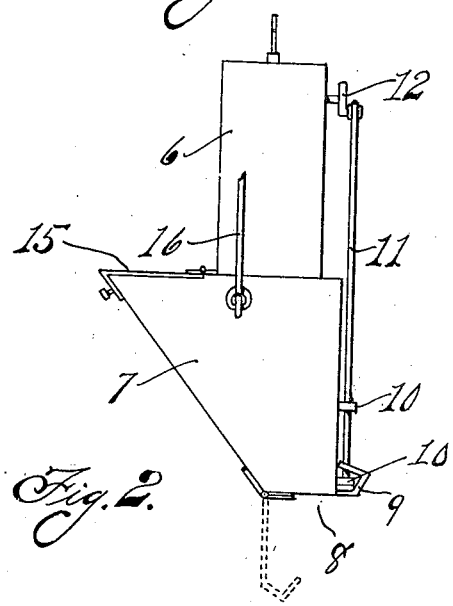
Figure 4:
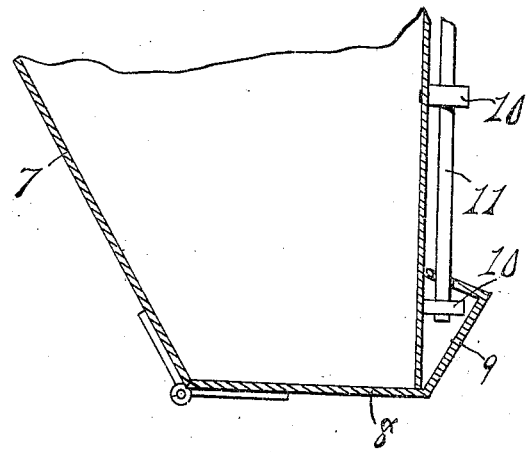

Figure 1 is a front view of the device. Fig. 2 is a side view of the hopper. Fig. 3 is a back view of the whole device. Fig. 4 is a vertical section of the hopper.

Referring specifically to the drawings. 7 indicates a hopper in which the grain or other feed is placed, and this has a hinged valve 8 at its lower end provided with a curved finger or projection 9 in which is a vertical hole adapted to receive the lower end of a rod 11 which works through guide 10 on the back of the hopper and is connected at its upper end to the alarm key 12 of an ordinary alarm clock 6. Other timing devices may be substituted for the alarm clock. The hopper has a bail 16 by which it may be hung up, and has a hinged lid 15 at the top, the clock 6 being mounted on the fixed top of the hopper.

Below the hopper is a conical spreader 14, the apex of which is located under the valve or door 8.

13 are supporting rods or legs attached between the hopper and the spreader and serving to hold said parts in relative position.

When used on the floor or ground the spreader serves as a base on which the device stands, the legs 13 supporting the hopper above the spreader, which thereby serves the purpose of a base and also the function of a spreader to distribute the grain. When hung up by the bail 16 the spreader hangs under the hopper and so distributes the grain.

In operation when the key 12 turns at the appointed time it pulls up the rod 11 a sufficient distance to detach its lower end from the hole in the finger 9, which permits the door or valve 8 to open and discharge the grain onto the spreader which is suspended by the legs 13.

I claim:

A portable stock feeder comprising a hopper having a valve at the bottom, a bail attached to the hopper for carrying the same, a clock mounted on top of the hopper, controlling connections between the clock and the valve, and extending beside the hopper, a conical spreader located under the hopper and forming a base for the feeder, and a plurality of spaced legs rigidly connected between the hopper and the inclined sides of the spreader, to support the hopper.

In testimony whereof, I do affix my signature in presence of two witnesses.

CHARLES DAMINAITIS.

Witnesses:
  JOHN A. BOMMHARDT,
  J. B. DAVIS.